United States Patent [19]

Goodman

[11] E Patent Number: Re. 33,263

[45] Reissued Date of Patent: Jul. 17, 1990

[54] TAMPERPROOF CABINET

[75] Inventor: Steve F. Goodman, Wyoming, Mich.

[73] Assignee: Herman Miller, Inc., Zeeland, Mich.

[21] Appl. No.: 371,600

[22] Filed: Jun. 26, 1989

Related U.S. Patent Documents

Reissue of:

[64] Patent No.: 4,722,285
Issued: Feb. 2, 1988
Appl. No.: 30,677
Filed: Mar. 26, 1987

U.S. Applications:

[63] Continuation of Ser. No. 810,035, Dec. 17, 1985, abandoned.

[51] Int. Cl.[5] ..... E05G 1/04; A47C 43/00

[52] U.S. Cl. ..... 109/50; 52/36; 312/247; 312/263; 248/551

[58] Field of Search ..... 109/39, 50–52, 109/69, 70; 52/36; 312/245, 263, 264, 247; 248/551

[56] References Cited

U.S. PATENT DOCUMENTS

| | | | |
|---|---|---|---|
| 937,215 | 10/1909 | Kelonge | 109/50 |
| 1,634,884 | 7/1927 | Peer | 109/51 |
| 2,086,019 | 7/1937 | Dyer | 109/51 X |
| 2,552,915 | 5/1951 | Zachrich | 312/39 X |
| 3,729,115 | 4/1973 | Lopatka | 312/247 |
| 3,749,465 | 7/1973 | Newcomer | 312/245 |
| 3,856,374 | 12/1974 | Christen | 312/263 |
| 4,013,254 | 3/1977 | Brandy et al. | 312/263 |
| 4,249,684 | 2/1981 | Miller et al. | 109/51 X |
| 4,322,205 | 6/1982 | Corl, Jr. | 312/263 |
| 4,391,204 | 7/1983 | Mitchell et al. | 109/51 X |

FOREIGN PATENT DOCUMENTS

| | | | |
|---|---|---|---|
| 595325 | 3/1958 | Italy | 312/263 |

*Primary Examiner*—Richard E. Chilcot, Jr.
*Attorney, Agent, or Firm*—Varnum, Riddering, Schmidt & Howlett

[57] ABSTRACT

A storage cabinet adapted for mounting on a wall having side panels, a bottom panel, a top wall, and door. Keyhole slots extend through edge portions of the bottom panel. A conventional screw and non-removable stud extend through each slot, with the studs being non-removably secured to the side panel. The screws engage the front portions of the keyhole slots and the studs engage the back portions of the keyhole slots. A cover is removably secured to the back inside portion of the side panel so that the back edge of the bottom panel is in abutting engagement with the cover.

12 Claims, 3 Drawing Sheets

TAMPERPROOF CABINET

Matter enclosed in heavy brackets [ ] appears in the original patent but forms no part of this reissue specification; matter printed in italics indicates the additions made by reissue.

This is a continuation, of application Ser. No. 810,035, filed Dec. 17, 1985, now abandoned.

BACKGROUND OF THE INVENTION

1. Field of the Invention

This invention relates to tamperproof cabinets. In one of its aspects, the invention relates to wallmountable cabinets assembled of panels and a lockable door wherein the panels are not removable without evidence of tampering when the door is locked.

2. State of the Prior Art

Wall-mountable cabinets are typically mounted onto walls through vertical slotted standards. Such cabinets conventionally include a top panel, side panels, a bottom panel, a back cover which is adjacent to the wall, and a flipper door which covers the front of the cabinet. These components are shipped in a knock-down condition and are assembled at the work space. The flipper door is typically hinged at the top on a guide track and is provided with a locking mechanism which can be used to lock the flipper door in the closed position. Whereas the cabinets have a multitude of uses, the typical wall-mounted cabinet may be subject to tampering notwithstanding the locking feature on the flipper door because the bottom panel of the cabinet is secured to the side panel by screws which are accessible from beneath the cabinet. A thief or vandal need only remove the screws attaching the bottom panel to the side panels to gain access to the interior of the cabinet. The typical wall-mounted cabinet is therefore not totally safe for storage of confidential or trade secret items.

Wall mounted safes are well known. Such structures are shown in the U.S. Pat. No. 1,634,884 to Peer issued July 5, 1927; Mitchell et al U.S. Pat. No. 4,391,204 issued July 5, 1983; and Kelonge U.S. Pat. No. 937,215 issued Oct. 19, 1909, all have a unitary construction and cannot be assembled at the office location from components shipped in a knockdown condition.

SUMMARY OF THE INVENTION

According to the invention, a wall-mounted storage cabinet with side panels, a top panel, a back cover, a door, and a bottom panel having slots through edge portions thereof is provided with a means to prevent removal of the shelf from the cabinet when the cabinet is locked. A conventional screw and non-removable stud extend through each slot, with the studs being secured to the side panel. The slots may be keyhole slots having a central portion of sufficient width and depth to allow the head of the non-removable stud to pass therethrough. The screws engage the front portions of the keyhole slots and the studs engage the back portions of the keyhole slots. The back cover includes a forwardly extending portion so that the back edge of the bottom panel is in abutting engagement with the back cover. The cabinet may be locked to a wall by a slidable lock bar located within the interior of the cabinet and engaging a bracket. The bracket slidably engages a vertical slotted standard mounted to a wall. The lock bar is secured in the desired position by a screw.

In this manner, with the cover removed from the cabinet, cabinet, the bottom panel may be detached from the side panels be removing the screws from engagement with the slots and then sliding the bottom panel backwardly until the non-removable studs are in registry with the central openings in the slots. At this time, the bottom panel can be detached from the side panels with the nonremovable studs remaining engaged with the side panel. However, when the back cover is secured to the side panels of the cabinet, the bottom panel cannot be removed because the bottom portion of the back cover arrests slidable rearward movement of the bottom panel. The back cover is secured to the side panel or a back panel by screws accessible only when the cabinet is detached from the vertical standards on the wall. Thus, the cover cannot be removed so long as the cabinet is secured to the wall. Unauthorized entry of the cabinet without evidence of tampering is thereby prevented. The mounting of the cabinet to the wall is accomplished through conventional mountings, but the cabinet is locked onto the wall supports through the lock bar which is accessible only through the inside of the cabinet.

In an alternate embodiment of the invention, the bottom portions of the side panels are provided with keyhole slots extending therethrough and the non-removable studs are secured to the edges of the bottom panel.

BRIEF DESCRIPTION OF THE DRAWINGS

The invention will be described with reference to the accompanying drawings wherein like members bear like referenced numerals and in which.

DESCRIPTION OF THE PREFERRED EMBODIMENT

Figure 1:
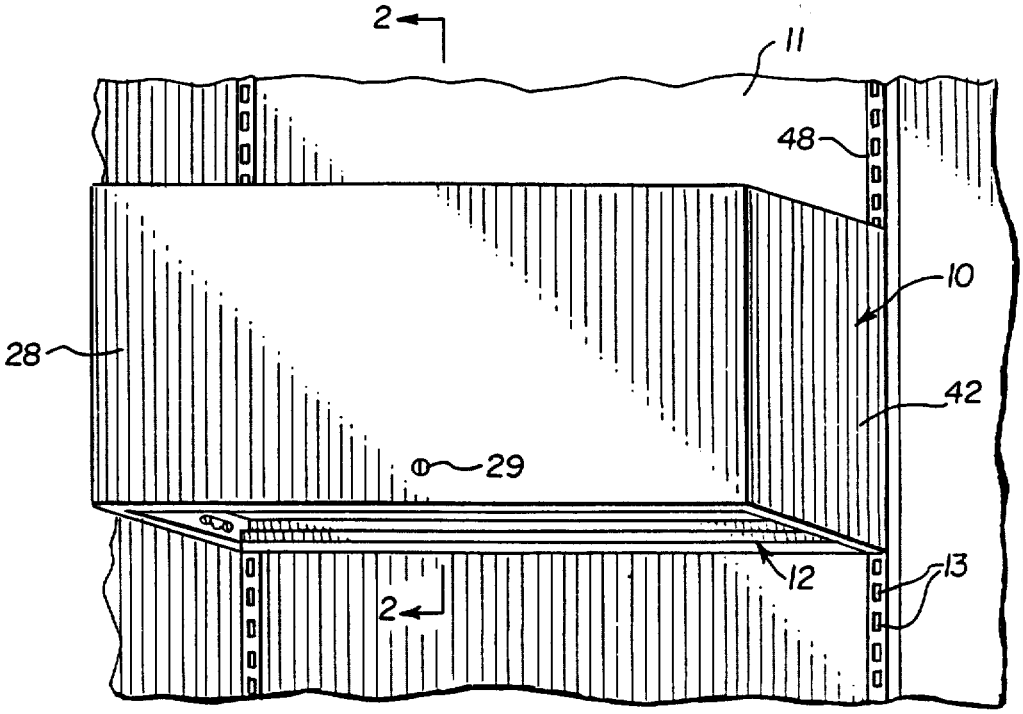
FIG. 1 is a perspective view of a storage cabinet according to the invention.
Figure 2:
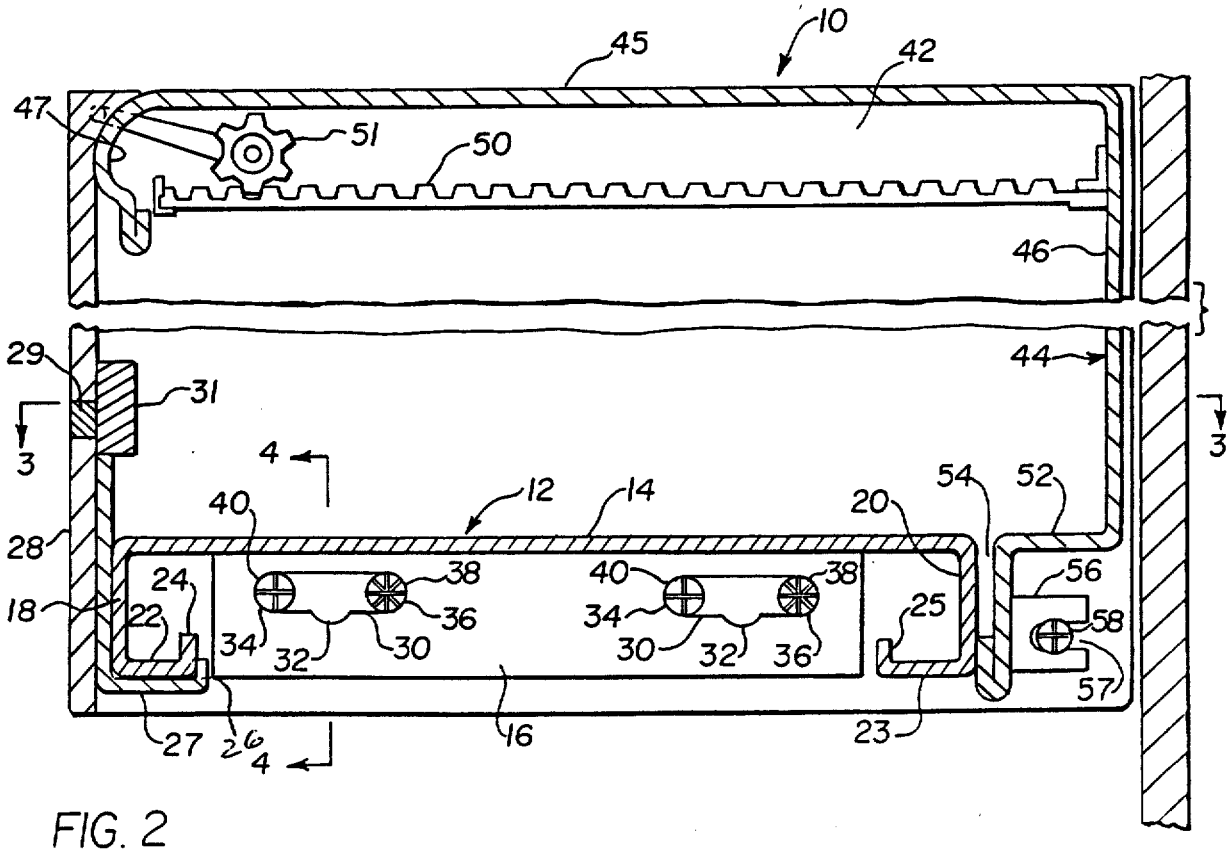
FIG. 2 is a cross-sectional view of the storage cabinet taken along line 2—2 of FIG. 1.
Figure 3:
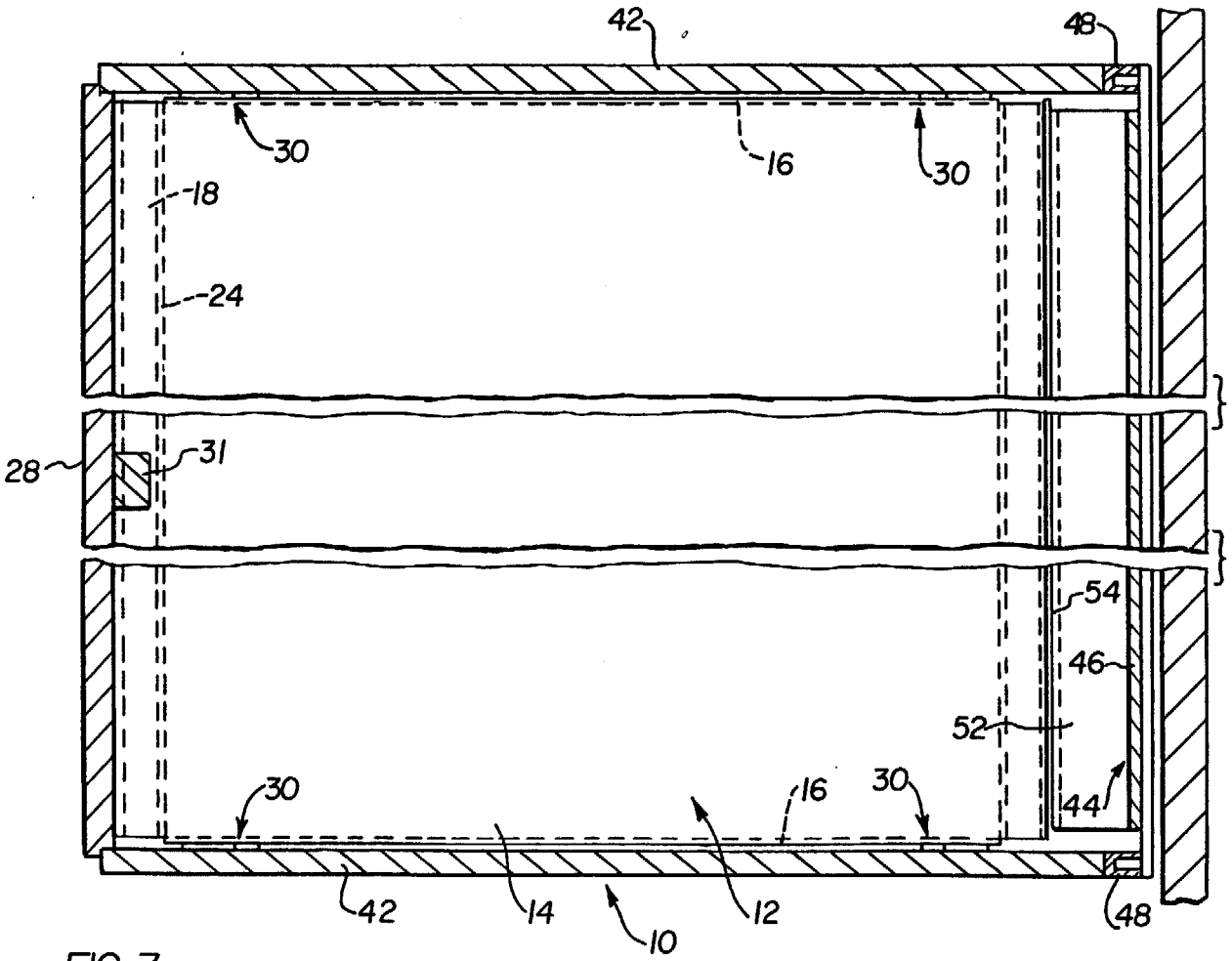
FIG. 3 is a cross-sectional view of the cabinet taken along line 3—3 of FIG. 2 and having screws and studs removed.
Figure 4:
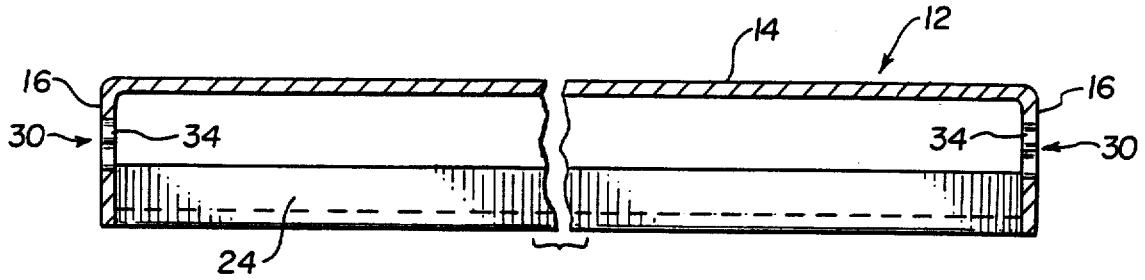
FIG. 4 is a cross-sectional view of the bottom shelf of the storage cabinet taken along line 4—4 of FIG. 2.

Referring to FIG. 1, a storage cabinet 10 of the type mounted onto walls through vertical slotted standards 48, and having a bottom panel 12, a flipper-style door 28, side panels 42, a back cover, and a top portion is shown. The cabinet 10 is shown mounted to a wall 11 through conventional standards 48 having a series of vertical slots 13. The flipper-style door 28 has a lock 29 for securing the door 28 in a closed position. As seen in FIG. 2, a bottom panel 12 comprises a horizontal shelf portion 14 with a downwardly extending edge portion 16 extending longitudinally along each laterally opposing edge thereof. A front downwardly extending end portion 18 extends laterally along the front end of the horizontal shelf portion 14 and is bent inwardly at 22 and upwardly at lip 24. Likewise, a back downwardly extending portion 20 has an inward flange 23 and an upward lip 25. The front bottom panel 12 is adapted to receive a locking bolt 27 which depends from a conventional key operated lock mechanism 29 located within a flipper-style door 28 to secure the door 28 in a closed position at the front of the cabinet 10.

*The locking bolt 27 has a downwardly-extending flange which extends alongside the bottom panel end portion 18, a laterally-extending flange which extends beneath the upward flange 22 of the bottom panel 12, and an upwardly-extending lip 26 which extends behind the bottom panel lip 24 when the bolt 27 is in the raised position illustrated in FIG. 2.* The locking bolt 27 is moved downward by the lock 29 [to engage an opening 26] *disengage the lip 24* in bottom panel 12 to [lock] *unlock* the door 28. The locking bolt 27 is moved upward by the lock 29 and lock mechanism 31 to [disengage the opening 26 and unlock] *engage the lip 24 and lock* the door 28. The bottom panel 12, downwardly extending edge portions 16, and the front and rear end portions 18, 20 are preferably formed from a single continuous sheet of material such as metal. The bottom panel of the cabinet may be conveniently formed by conventional bending or roll form operations performed upon an appropriately stamped or cut sheet of material.

Each downwardly extending edge portion 16 has a pair of keyhole slots 30 extending therethrough for receiving a support means for the bottom panel 12. Each keyhole slot 30 consists of a central opening 32, a forward portion 34, and a back portion 36. The upper edges of the forward and back portions 34, 36 and the upper edge of the central opening 32 lie in the same horizontal plane and thus define the upper edge of the slot. The central opening 32 extends to a greater vertical depth than do the forward and back portions 34 and 36 of the slot and is of sufficient width to allow passage of the head of stud 38 therethrough. The lower edge of the back and front portions of the slot are spaced vertically below the upper edge of the slot a sufficient distance to allow the body of a stud 38 to pass between the upper and lower edges of the slot, but sufficiently close to prevent the head of the stud 38 from passing therebetween.

Rectangular side panels 42 having inner and outer surfaces are provided to support the bottom panel 12 and to enclose the sides of the cabinet 10. The side panels 42 are in vertical spaced relationship in vertical planes perpendicular to the horizontal plane defined by the horizontal shelf portion 14.

Two non-removable studs 38 are secured to the lower portion of the inner surface of each side panel 42 for supporting the bottom panel 12. Each stud 38 is located immediately adjacent a back portion 36 of a slot 30 in an edge portion 16. Each stud includes a body adapted to slide within the back slot portion 36 and a head of sufficient diameter to prevent its passage between the upper and lower edges of a back slot portion 36, yet to allow passage of the head through a central opening 32.

The non-removable studs 38 are insertable into the side panels but cannot be removed therefrom without evidence of tampering, as for example, destroying the hole for the stud.

The bottom panel 12 is also secured to each side panel by two screws 40[,] . A screw 40 is located at the lower portion of the inner surface of each side wall immediately adjacent to each forward slot portion 34 in en edge portion 16. Each screw 40 includes a threaded body adapted to fit between the upper and lower edges of a forward portion of a slot 34 and a head of sufficient diameter so that it will not pass between the upper and lower edges of the forward portion of a slot 34. The two screws 40 and the two non-removable studs 38 lie in the same horizontal plane which is a plane parallel to the horizontal plane defined by the horizontal shelf portion 14.

A back cover 44 including a vertical sheet 46 is provided to enclose the rear of the cabinet 10. In the preferred embodiment, the back cover 44 includes a bend at the upper portion thereof forming a top portion 45, integral with the back cover 44 and lying in a horizontal plane parallel to the horizontal plane defined by the horizontal shelf portion 14. In the preferred embodiment, the front edge of the top portion is down turned to form a door seating ledge 47 against which a flipper-style door 28 seats.

A forward ledge 52 is formed in the back cover 44 in the same horizontal plane as the plane defined by the horizontal shelf portion 14 by a forward bend at the lower portion of the back cover 44. An interior surface is thereby created at the bottom of the cabinet 10 consisting of the horizontal shelf portion 14 and the forward ledge 52. The front edge of this forward ledge 52 is down-turned to create a stop 54 against which the bottom panel 12 may abut. Flanges 56 having slots 57 are provided at opposed edges of the stop 54 adjacent the side panels 42 to secure the back cover 44 to the side panel through a non-accessible screw 58. The slot 57 is adapted to receive the body of the non-accessible screw 58 to secure the back cover 44 to the side panels 42. The back cover 44 may be further secured to the side panels 42 by screws accessible from the interior of the cabinet 10 or from the rear vertical face of the back cover 44. The rearwardly extending portion of stop 54 extends rearwardly a sufficient distance to render the non-accessible screw 58 safe from tampering if the cabinet is secured to a wall.

The flipper-style door 28 is movably secured at the upper portion of the side panels 42 to a track 50 by means of a gear 51 so that, when closed, the door encloses the front of the cabinet 10. When fully opened, the door seats on top of the cabinet 10. The flipper-style door 28, the top portion, the back cover 44, the bottom panel 12, and the side panels 42 thereby enclose the interior of the cabinet 10. Locking bolt 27 can be moved vertically to engage opening 26 by a conventional key operated lock 29 and lock mechanism 31, thereby locking the door in a closed position.

In the preferred embodiment, the cabinet 10 is secured to a wall 11 through clips 43 on the side panels 42 and vertical slotted standards 48 mounted on the wall 11. The clips have hooks 49 which engage the slots 13 in the standard in conventional fashion as shown in U.S. Pat. No. 4,171,789, to Vander Hoek et al [No. 4,171,789,] issued Oct. 23, 1979; Hogue U.S. Pat. No. 4,387,872, issued June 14, 1983; and Boundy et al U.S. Pat. No. 4,013,254, issued Mar. 22, 1977. The back cover 44 can also be secured to a back panel (not shown) by screws accessible only when the cabinet 10 is detached from the vertical standards.

In use, the screws 40 engage the forward portions 34 of a pair of keyhole slots 30 in the down-turned edge portions 16. The screws 40 thereby secure the bottom panel 12 to the side panel 42. If the screws 40 are removed from the side panel 42 the non-removable studs 38 continue to support the bottom panel 12. Disengagement of the bottom panel 12 from the side panels 42 requires that the bottom panel 12 be pushed toward the rear of the cabinet 10 until the heads of the studs 38 become free of the back slot portion 36 and come into registry with the central openings 32. This rearward movement required to disengage the bottom panel 12 is prevented by the stop 54 of the back cover 44. If the cabinet 10 is installed so that the back cover 44 is adjacent a wall the non-accessible screw cannot be reached and the stop 54 cannot be removed to allow rearward movement of the bottom panel 12. Unauthorized personnel are thereby prevented from removing the bottom panel 12. If desired, authorized personnel can remove the bottom panel 12 by removing the cabinet 10 from the wall. The means releasably securing the cabinet 10 to the wall should be located within the enclosed interior of the storage cabinet 10.

*As seen in FIG. 2, the lip 26 of the locking flange 27, positioned behind the bottom panel lip 24, also prevents rearward movement of the bottom panel 12 with respect to the side panels 42, when the locking flange is in the locked position illustrated in FIG. 2. Thus, even without an interface between the bottom panel 12 and the back cover 44, rearward movement of the bottom panel 12 with respect to the side panels 42 is prevented without evident tampering to the side panels 42.*

Figure 5:
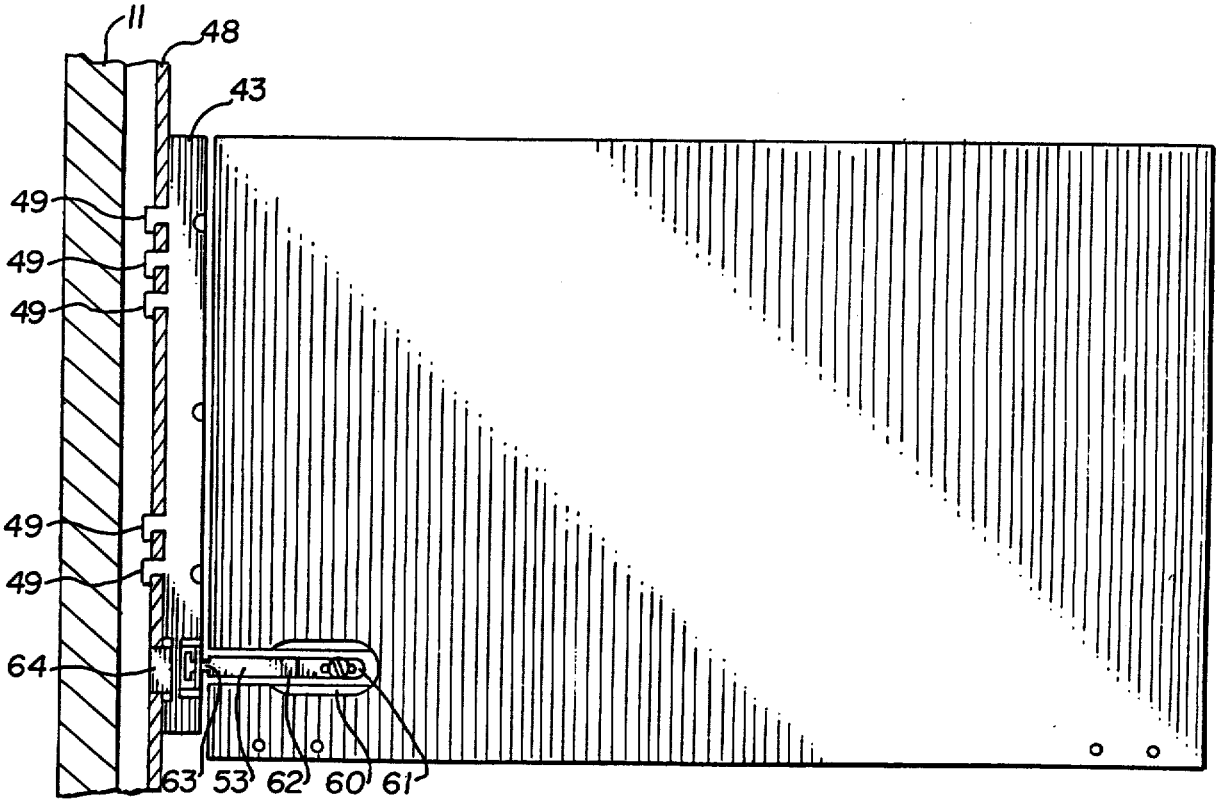
FIG. 5 is a side view of the inside surface of a side panel of the storage cabinet showing a means for releasably securing the cabinet to a wall.

As best shown in FIG. 5, the means releasably securing the cabinet 10 to the wall comprises a slidable lock bar 59 secured within a recess 60 in the inside surface [surface] of a side panel 42 by means of a screw 61. For purposes of clarity, the bottom panel 12, the back cover 44 and the flipper-style door are not shown in FIG. 5. The lock bar 59 is provided with a raised portion 62 to facilitate grasping and a tongue 63 at the rear end of the lock bar. The tongue 63 engages a bracket 64 slidably mounted within the clip 43. To secure the cabinet 10 to the wall, the lock bar 59 is moved rearward and the screw 61 is tightened. The rearward movement of the lock bar 59 causes the bracket 64 to be moved rearward so that the back end of the bracket 64 extends into a slot in the vertical slotted standard 48. The bracket 64 thereby prevents vertical movement of the hooks 49 which secure the cabinet 10 to the wall. To remove the cabinet 10 from the wall, the screw 61 is loosened and the lock bar 59 moved forward. The forward movement of the lock bar 59 causes the bracket 64 to be moved forward so that the back end of the bracket 64 is removed from engagement with the slot in the vertical slotted standard 48. The cabinet 10 may then be moved vertically and the hooks 49 disengaged from the vertical slotted standard 48. After removal from the wall, an authorized person can easily remove the non-accessible screw 58 from the slot 57 defined by the fingers of the flange 56. The stop 54 of the back cover 44 may thereby be removed permitting rearward movement of the bottom panel 12 after the screws 40 have been removed.

In the embodiment of the invention described and illustrated in FIGS. 1 through 5, keyhole slots 30 are provided in edge portions 16 of the bottom panel 12. Studs 38 and screws 40 extend through slots 30 in side panels 42. In an alternative embodiment, the invention can likewise comprise keyhole slots in the side panels rather than in the bottom panel (not shown). In this embodiment the keyhole slots are engaged by studs and screws secured in the edge of the bottom panel.

The foregoing disclosure and drawings are merely illustrative of the invention and are not intended to limit the invention to the disclosed embodiments. Reasonable variation and modification are possible within the scope of the foregoing disclosure and drawings without departing from the spirit of the invention.

The embodiments of the invention in which an exclusive property or privilege is claimed are defined as follows:

1. A storage cabinet adapted for mounting on a wall and including side panels, a top panel, a bottom panel, a back panel, and a door for closing an opening between said top panel, bottom panel, and side panels, all of said panels and door being joined together to define an enclosed space, said bottom panel is removably joined to said side panels through exposed fasteners outside said enclosed space and extending through said bottom panel and side panels, the improvement which comprises:

a slot in one of said bottom panel and side panels for retaining said exposed fasteners when said bottom panel is in a forward position with respect to said side panels;

one of said exposed fasteners mounted in an end portion of said slot to prevent forward movement of said bottom panel with respect to said side panel, said one fastener being secured to the other of said bottom panel and side panels in a non-removable fashion by which said one exposed fastener cannot ordinarily be removed without evident damage to said other of said bottom panel and side panels;

means including said back wall to prevent movement of said bottom panel from said forward position to said rearward position when said cabinet is assembled;

whereby said bottom panel can be removed from said side panels in the absence of said back panel by sliding said bottom panel rearwardly with respect to said side panels when all said fasteners except said one non-removable fasteners are removed; and means to secure said back panel to said side panels, said securing means being inaccessible when said cabinet is mounted to said wall and being accessible for removing said back wall from said side panels when said cabinet is removed from said wall;

whereby said bottom panel cannot be removed from said side panels while said cabinet is mounted to said wall without evident damage to the other of said bottom panel and side panels, thus preventing disassembly of said cabinet when said door is locked in said opening without evidence of tampering.

2. A storage cabinet according to claim 1 and further comprising means to selectively prevent removal of said cabinet from said wall.

3. A storage cabinet according to claim 2 wherein said means to selectively prevent removal of said cabinet from said wall is positioned within said enclosed space.

4. A storage cabinet according to claim 3 and further comprising means to lock said door in closed position covering said opening between said top panel, said bottom panel and said side panels.

5. A storage cabinet according to claim 3 wherein said means to selectively prevent removal of said cabinet from said wall comprises a slidable lock bar having a slot to receive a screw and further having a togue at one end for engaging a bracket adapted to engage a slot in a vertical slotted standard secured to said wall; and a screw extending through said slot in said slidable lock bar for securing said slidable lock bar in the desired position.

6. A storage cabinet according to claim 2 wherein said means to prevent movement of said bottom panel comprises a forwardly projecting portion of said back panel adapted to abut against said bottom panel.

7. A storage cabinet according to claim 2 wherein said means to selectively prevent removal of said cabinet from said wall comprises a slidable lock bar having a slot to receive a screw and further having a tongue at one end for engaging a bracket adapted to engage [to] *a* slot in a vertical standard secured [in] *to* said wall; and a screw extending through said slot in said slidable lock bar *for* securing said slidable lock bar in the desired position.

[8. A storage cabinet according to claim 1 and further comprising means to selectively prevent removal of said cabinet from said wall.]

[9. A storage cabinet according to claim 8 wherein said means to prevent removal of said cabinet from said wall is positioned within said enclosed space.]

[10. A storage cabinet according to claim 9 and further comprising means to lock said door in a closed position covering said opening between said top panel, said bottom panel and said side panels.]

11. A storage cabinet according to claim [10] *3* wherein said means to selectively prevent removal of said cabinet from said wall comprises a lock bar slidably mounted to an interior surface of one of said panels for movement forwardly and rearwardly with respect to said panels, said lock bar having a tongue at one end for engaging a slot in a vertically slotted standard secured to said wall; and means for securing said lock bar in the desired position.

12. A storage cabinet according to claim 11 wherein said means to prevent movement of said bottom panel includes a forwardly extending bottom portion and a downwardly extending flange at a bottom portion of said back panel.

13. A storage cabinet according to claim 12 wherein said means to secure said back panel to said side panels comprises a removable fastener engaging said downwardly extending flange of said back panel so as to secure said back panel to an adjacent one of said side panels.

14. A storage cabinet according to claim 13 wherein other of said exposed fasteners are removable and extend through said slots at an opposite end to the one fastener for securing said bottom panel to said side panel.

15. A storage cabinet according to claim 1 wherein said bottom panel has downturned flanges at the sides thereof and said slot is formed in said downturned flanges.

* * * * *